(12) United States Patent
Naboulsi

(10) Patent No.: US 10,532,709 B2
(45) Date of Patent: *Jan. 14, 2020

(54) SAFETY CONTROL SYSTEM FOR VEHICLES

(71) Applicant: Safe Driving Technologies, LLC, Suffern, NY (US)

(72) Inventor: Mouhamad A Naboulsi, West Bloomfield, MI (US)

(73) Assignee: Safe Driving Technologies, LLC, Suffern, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,786

(22) Filed: Sep. 25, 2018

(65) Prior Publication Data

US 2019/0031124 A1 Jan. 31, 2019

Related U.S. Application Data

(60) Continuation of application No. 15/657,777, filed on Jul. 24, 2017, now Pat. No. 10,081,317, which is a
(Continued)

(51) Int. Cl.
*B60R 16/023* (2006.01)
*B60R 11/02* (2006.01)
(Continued)

(52) U.S. Cl.
CPC ........... *B60R 16/0232* (2013.01); *B60Q 9/00* (2013.01); *B60Q 9/008* (2013.01); *B60R 11/0264* (2013.01); *B60R 16/023* (2013.01); *G06F 3/017* (2013.01); *G06F 3/0227* (2013.01); *G06F 17/00* (2013.01); *G08B 21/06* (2013.01); *H04M 1/6083* (2013.01); *H04M 1/6091* (2013.01);
(Continued)

(58) Field of Classification Search
None
See application file for complete search history.

(56) References Cited

U.S. PATENT DOCUMENTS

| | | | |
|---|---|---|---|
| 6,393,301 B1 | 5/2002 | Oda | |
| 6,690,940 B1 | 2/2004 | Brown et al. | |
| 6,973,333 B1 * | 12/2005 | O'Neil | H04W 48/04 340/425.5 |

* cited by examiner

*Primary Examiner* — Richard M Camby
(74) *Attorney, Agent, or Firm* — FisherBroyles LLP; Richard M. Lehrer

(57) ABSTRACT

According to one aspect of one embodiment of the present invention, a safety control system for using applications in vehicles, includes, a communication device having at least one of an input accessible from within the vehicle and an output communicated within the vehicle, at least one sensor operable to sense at least one condition related to vehicle operation, and data about distraction features of a running application, to and a controller communicated with the sensor and the communication device to selectively suppress at least one of said input and said output in response to a sensed parameter of said at least one condition being outside of a threshold. When an input is suppressed, the driver is prevented from accessing or inputting information into the communication device. When an output is suppressed, communication between the device and the driver of a vehicle is suppressed to, among other things, avoid distracting the driver during certain driving situations or conditions relating to the driver, vehicle and/or environment.

16 Claims, 4 Drawing Sheets

Related U.S. Application Data continuation of application No. 15/352,206, filed on Nov. 15, 2016, now Pat. No. 9,713,994, which is a continuation of application No. 14/661,598, filed on Mar. 18, 2015, now Pat. No. 9,524,034, which is a continuation of application No. 13/663,085, filed on Oct. 29, 2012, now Pat. No. 9,047,170, which is a division of application No. 10/838,708, filed on May 4, 2004, now Pat. No. 8,301,108.

(51) Int. Cl.
| | | |
|---|---|---|
| *G08B 21/06* | (2006.01) | |
| *G06F 17/00* | (2019.01) | |
| *B60Q 9/00* | (2006.01) | |
| *G06F 3/01* | (2006.01) | |
| *G06F 3/02* | (2006.01) | |
| *H04M 1/60* | (2006.01) | |
| *H04M 1/725* | (2006.01) | |
| *B60R 11/00* | (2006.01) | |

(52) U.S. Cl.
CPC ... *H04M 1/72577* (2013.01); *B60K 2350/906* (2013.01); *B60K 2370/195* (2019.05); *B60R 2011/001* (2013.01); *B60W 2520/105* (2013.01)

SAFETY CONTROL SYSTEM FOR VEHICLES

REFERENCE TO CO-PENDING APPLICATIONS

The present application is a continuation of U.S. patent application Ser. No. 15/657,777 which was filed Jul. 24, 2017, which claims the benefit of priority from U.S. patent application Ser. No. 15/352,206 which was filed Nov. 15, 2016, which claims the benefit of priority from U.S. patent application Ser. No. 14/661,598 filed Mar. 18, 2015, which claims the benefit of priority from U.S. patent application Ser. No. 13/663,085 which was filed Oct. 29, 2012, which claims the benefit of priority from U.S. patent application Ser. No. 10/838,708 which was filed May 4, 2004, which claims the benefit of priority from U.S. patent application Ser. No. 10/287,299, filed Nov. 4, 2002, which claims the benefit of priority from U.S. patent application Ser. No. 10/279,447, filed Oct. 24, 2002, Provisional Application No. 60/336,293 filed Oct. 24, 2001, and Provisional Application No. 60/390,877 filed Jun. 21, 2002, the contents of which are each incorporated herein by reference.

FIELD OF THE INVENTION

The present invention relates to the field of telematics, namely to the field of integrating information, communication, computing and entertainment technologies into vehicles for civilian or military use. The invention particularly relates to safety control systems for vehicles to reduce driver distraction, avoiding potentially dangerous conditions tending to produce accidents.

BACKGROUND OF THE INVENTION

One potentially dangerous condition is the use of a vehicle telephone by the vehicle driver while driving the vehicle. The use of telematics in general and particularly cellular telephones by drivers while driving has been found to increase the possibility of an accident since such a telephone not only diverts the driver's attention from driving, but also generally requires the use of at least one of the driver's hands and distract the driver's eyes from the road and traffic. In fact, many states and countries have enacted legislation requiring that telephones used in vehicles by drivers while driving must be of the "hands free" type and usually telematics equipment carries a warning to educate and discourage the driver about the risk of using these devices while driving. However, such legislation is difficult to enforce and education is not usually effective in assuring driver compliance. Moreover, even where the vehicle is equipped with a "hands free" telephone, drivers nevertheless still frequently use one hand for holding or dialing the telephone. When one hand is occupied by holding a telephone, the danger of causing an accident in an emergency situation is increased because of the additional reaction time required to properly grip the steering wheel with both hands. Similar danger exists when the driver attempts to control audio and video equipment, e.g. Radio, Music CD, DVD, Books on tape etc., or when the driver attempts to change environmental controls like adjusting the heat or air conditioning, or other vehicle settings.

There are other potentially dangerous conditions and inherent risks in driving that depends on the driving act itself, such as rapidly accelerating or decelerating, excessive maneuvering, merging to or exiting a freeway, passing, changing lanes, changing gears, depressing the clutch, driving at high speed, negotiating a turn, braking, reverse-driving, or a stress condition on the part of the driver, that could increase the possibility of an accident should the driver be distracted by activation of the telephone or other signal or device. This inherent risk is also dependent on the driving purpose as well, for example, the risk in driving a police cruiser is inherently riskier than in driving a sedan, and driving a delivery van has different risk than driving the family van.

Herbert et al., U.S. Pat. No. 6,188,315 and Brown, U.S. Pat. No. 6,353,778, disclose systems for avoiding preset potentially dangerous conditions while operating a vehicle having a vehicle telephone, but the systems described in those patents are of relatively limited application, and do not provide for avoiding dangerous conditions or to managing risk and individualizing the warnings to individual driving skills or application and to combinations of events and environmental conditions.

SUMMARY OF THE INVENTION

An object of at least some presently preferred embodiments of the present invention is to provide a safety control system for vehicles tending to reduce the possibility of accidents in one or more of the above respects. Another object of at least some presently preferred embodiments of the invention is to provide a method of reducing or avoiding driver distraction during potentially dangerous conditions encountered while operating a vehicle.

According to one aspect of one embodiment of the present invention, a safety control system for vehicles, includes, a communication device having at least one of an input accessible from within the vehicle and an output communicated within the vehicle, at least one sensor operable to sense at least one condition related to vehicle operation, and a controller communicated with the sensor and the communication device to selectively suppress at least one of said input and said output in response to a sensed parameter of said at least one condition being outside of a threshold. When an input is suppressed, the driver is prevented from accessing or inputting information into the communication device. When an output is suppressed, communication between the device and the driver of a vehicle is suppressed to, among other things, avoid distracting the driver during certain driving situations or conditions.

According to one aspect of one embodiment of the present invention, there is provided a safety control system for vehicles including a telephone or other input or output device and one or more sensors for sensing instantaneous driver stimuli and/or a potentially dangerous condition and for automatically disabling or suppressing the telephone or other input or output device when sensing such stimuli and condition. In one form, the sensors include two sensors mounted on a steering member to provide an indication of the presence of the driver's hands on the vehicle steering member, and effective to suspend use of the telephone or other input/output device when the two hands of the driver are not sensed as present on the steering member while the vehicle is in motion. This system is modular, dynamic, interactive, and adaptive to each individualized user. In one implementation, the invention employs a method for automated machine prioritizing to provide assistance to the driver and optimize the functionality of telematics features accessibility by arranging them according to a user's needs and preferences based on usage frequency of individual features and/or application or as customized individually by the user preferences, skills and events. In another embodiment, sensors on a steering member are used to measure changes in driver physiology. Other methods can be used for sensing driver physiology, e.g. via infrared detection, camera and image/color recognition etc.

Smart Speaker: Incoming calls are routed to a speaker that reflects and bounce sounds of front windshield at driver Look Ahead, Eye Level. Or simulate such action so that a driver focuses or has his/her attention directed toward the windshield just like he would do if he is carrying a conversation with another person.

According to further aspects in the described preferred embodiment, the steering member is a steering wheel, and the sensors include two sensors on opposite sides of the steering wheel located to sense the presence of the driver's hands on the steering wheel. Preferably, the two sensors are located approximately on or between the "two" and "ten" and the "three" and "nine" clock positions of the steering wheel.

It will thus be seen that such a system, requiring both hands to be on the steering wheel in order for the driver to operate the input/output devices, not only requires the vehicle to be equipped with a "hands free" interface for the input/output devices, or a system that can be used as such with an adapter or when docked to the system gateway, but also enforces the use of the "hands free" feature by sensing that the driver actually has both hands placed on the steering member before the input/output devices can be operated accessed or displayed to the driver. Disabling the operation of the device would preferably include not only disabling making outgoing and receiving incoming telephone calls, but also disabling the signal (typically audible tones, vibrations, or visible light) of an incoming call, fax, e-mail, the display of non-urgent vehicle status or warning indicators, since such signals, indicators or displays can distract the driver. Such distractions are problematic at times and conditions wherein operation of the vehicle requires more than usual driver attention and interaction, or when other distractions are already present for the driver.

According to further features in the described preferred embodiment, the vehicle may also include a computer or the driver may also use a portable multi-function telematics device in the vehicle allowing access to the Internet or other network for transmitting and/or receiving faxes or e-mail or browsing the web or accessing a WAN, with the sensors also disabling driver initiated access to such devices when the two hands of the driver are not sensed on the steering member while the vehicle is in motion.

In most cases, the steering member would be a steering wheel as presently included in conventional vehicles. However, in certain applications the steering member could be a joystick, or other type of steering member. In such case, the sensors are placed in areas a driver is recommended or required to grip the steering member to safely control the vehicle.

According to further optional features in the preferred embodiment of the invention described below, the sensors may further include devices for sensing vehicle acceleration, deceleration, merging onto or exiting a freeway, passing, changing lanes, changing gears, depressing the clutch, a reverse-drive condition of the vehicle, the braking of the vehicle, the undue proximity of the vehicle to another vehicle, excessive maneuvering, and/or an unduly high velocity of the vehicle, any one of which conditions, or combination of conditions, may also be effective to disable the operation of the telephone, computer, or other potentially distracting equipment, display or indicator within the vehicle.

According to still further optional features in the preferred embodiment of the invention described below, at least one of the sensors on the steering member also senses a physiological condition of the driver and disables the input/output devices when a predetermined physiological condition is sensed. For example, the physiological conditions sensed could be a predetermined gripping force applied by a hand of the driver while gripping the steering wheel, or a predetermined pulse rate, temperature, blood pressure, blood oxygen level, and/or skin conductivity of the driver. Such physiological conditions may indicate a stress condition of the driver and, when sensed, can lead to disabling or suppressing operation of the input/output devices to avoid aggravating the stressed condition.

The system may also sense a drowsiness condition of the vehicle operator. For example, the system may include a steering direction sensor that actuates a drowsiness alarm when sensing a failure to change the steering direction within a predetermined time, distance interval while accounting for vehicle speed in indicating a possible drowsiness condition in the driver. Additionally, such sensor when monitored with respect to changes over time will indicate jerk reaction, which indicates that the driver was not paying attention and the system will temporarily suspend all telematics to give the driver a chance to recover. Another application for such a sensor is the monitoring of an OFF Zero angle for an extended period of time/distance which can indicate a blind curve or hard curve, and again, here the system will temporarily suspend the telematics and/or input/output devices from interacting with the driver, and vice versa, until normal driving functions are restored.

According to another aspect of the present invention, there is provided a method of avoiding potentially dangerous conditions while operating a vehicle having an input/output device and a steering mechanism including a steering member to be manipulated by the driver, comprising: providing the steering member with two sensors for sensing the presence on the steering member of the two hands of the driver; and disabling the input/output device when the two sensors fail to sense the presence on the steering member of both hands of the driver while the vehicle is in motion.

According to further features in the described preferred embodiment, the input/output devices may also be disabled when the vehicle is traveling in the reverse direction, or is being braked, or is within a predetermined proximity of another vehicle, or is traveling at a high velocity, accelerating, decelerating, merging onto or exiting a freeway, passing, changing lanes, changing gears, depressing the clutch, or a driver is occupied using other accessories in the vehicle or otherwise distracted. Since a high degree of attention of the driver is required under all the foregoing conditions, operation of the vehicle telephone, for example, even the ringing signal of an incoming telephone call, could be highly distracting to the driver and is therefore disabled to avoid the possibility of increasing the risk of an accident.

To assure that the driver and the vehicle as well as on board communication devices as described above are working harmoniously together, one presently preferred embodiment of the system includes the following The Driving Systems, (Man, Machine, Environment, Regulation, and History)
   Man: the driver, the passengers, the pedestrians, society;
   Machine: the car, the telematics, the infrastructure;
   Environment: the driving environment (in the car and outside the car and the infrastructure used)
   History: the personal driving experience, the equipment maintenance history
   Regulation: the existing laws and common safe driving etiquette into, society and the infrastructure regulation.

All of these elements will be harmonized by the system as it isolates the drivers from non driving related distractions and helps them comply with driving related laws and etiquette via reminders and passive assistance.

Further features and advantages of at least some of the embodiments or implementations of the invention will be apparent from the description below.

BRIEF DESCRIPTION OF THE DRAWINGS

These and other objects, features and advantages of the present invention will be apparent from the following detailed description of the preferred embodiments and best mode, appended claims and accompanying drawings in which:

DETAILED DESCRIPTION OF THE PREFERRED EMBODIMENTS

Figure 1:
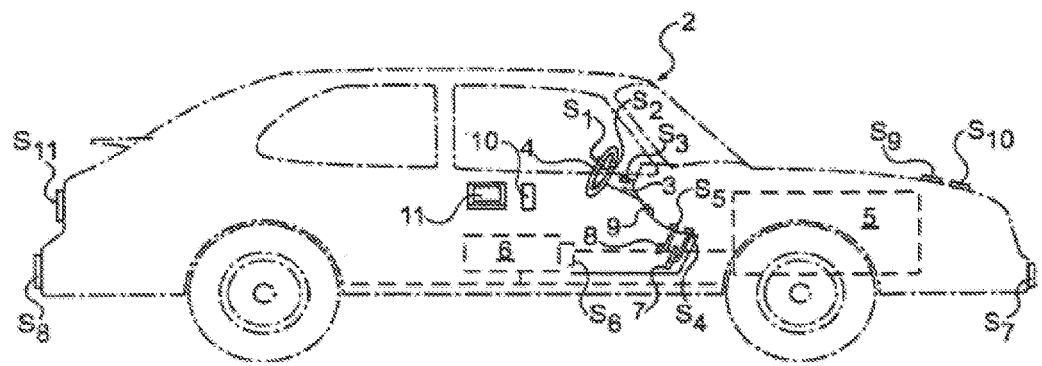
FIG. 1 schematically illustrates one form of a safety control system for vehicles constructed in accordance with the present invention.

FIG. 1 schematically illustrates a vehicle, generally designated 2, equipped with a control system for sensing a variety of risk factors and potentially dangerous conditions and for automatically executing various responses when sensing such conditions in order to avoid hazardous situations tending to increase the possibility of an accident. One response is the disabling or suppression of one or more input or output devices to avoid interaction between the devices and the driver in certain situations and conditions. Another response includes providing a signal to or requiring the driver to take some action to increase driver alertness and/or awareness.

One example of a hazardous situation avoided by the control system illustrated in FIG. 1 is the use of the vehicle telephone in certain situations wherein a making of a telephone call by the vehicle driver, or the receiving of an incoming call, particularly the ringing of such a call, may distract the driver and increase the possibility of an accident when the driver is in a high-risk driving situation. Similar increased risk can result from the driver changing vehicle controls like temperature settings, or interacting (e.g. inputting or receiving output) with other telematics such as e-mail, radio, CD, DVD, navigation system, incoming page or the like. In such cases, the vehicle telephone, other telematics and/or other input/output devices are suppressed and no incoming or outgoing signals are allowed to distract the driver. In case the driver is the party initiating the telematics, a visual indicator and audio feedback can be activated to indicate to the driver that telematics is disabled, supply reason therefore, and even recommend driving modification to enable telematics. Another condition sensed by the system is undue stress in the driver, as indicated by the sensed pulse rate, temperature, blood pressure, skin conductivity (e.g. perspiration), loud voice(s) or stressful sounds in the cabin, such as baby crying, dog barking etc., any combination of one or more of which conditions would also disable incoming telematics. A further condition sensed by the system is the possibility of drowsiness on the part of the driver, in which case an audio alarm would be activated to alert the driver to this condition. Examples without limitation of other alarms to overcome driver drowsiness include vibration in the seat, changing HVAC temperature settings and blower speed to extremes, change of seat position, radio volume or station, CD-track etc. The system will restore operation of the input/output devices when conditions are normalized and will notify driver of all missed activities.

Vehicle 2 illustrated in FIG. 1 is a conventional vehicle including a steering mechanism, generally designated 3, having a steering wheel 4, a propulsion device such as a motor or engine 5 for driving the vehicle via a transmission or other torque converting means schematically indicated 6, an acceleration pedal 7, and a braking pedal 8 for controlling the vehicle. Vehicle 2 further includes one or more visual indicator and audio alarms 9, e.g. mounted within the forward-look ahead viewing or hearing by the driver.

FIG. 1 further schematically illustrates a cellular telephone 10 within the vehicle, and a computer 11 or other multifunction telematic device allowing access to the Internet for transmitting and/or receiving faxes or e-mail, WAN and Web access, or other input/output device. Other input/output devices include vehicle fault/warning lights (battery, temperature, washer fluid, etc.) or other signal or alarm (open door, low fuel level, seat belt monitor, etc.). Vehicle 2 illustrated in FIG. 1 may also include many other components conventionally provided on vehicles at the present time or to be provided in the future.

The safety control system included in vehicle 2 illustrated in FIG. 1 includes a plurality of sensors for sensing various conditions with respect to the vehicle driver, the vehicle itself and/or the environment. These signals are collected via direct tapping to existing or added sensors or via vehicle bus and user specified values. These include sensors S1 and S2 applied to the steering wheel 4 of the vehicle; sensor S3 applied to the steering mechanism 3 of the vehicle to sense changes in the steering direction and/or actuation of the turning indicator. The turning signal indicator switch/lever can also act as a blind spot collision avoidance actuator. When a driver actuates the turn signal indicator by moving the turning signal lever in advance of making a turn, subsequent momentary pull up or momentary push down on the lever will move the corresponding mirror further out to scan the vehicle blind spot.

Other sensors may include sensor S4 sensing the condition of the gas pedal 7 and/or vehicle speed or acceleration; sensor S5 sensing the condition of the braking pedal 8; and sensor S6 sensing the condition of the transmission or other type torque converter 6.

Also schematically illustrated in FIG. 1 are sensors S7 and S8 carried to sense the proximity of the vehicle with respect to another vehicle; sensor S9 sensing darkness or alternatively sensing the activation of the headlight; and sensor S10 sensing weather conditions rain, sleet, snow, ice, temperature and/or sensing the activation of the front or rear wipers or headlight wipers.

As will be described more particularly below, the foregoing sensors (or signals) are generally effective only when the vehicle is moving to sense their respective conditions and to execute certain control functions in order to decrease the possibility of an accident. One important control function is to disable an incoming call from ringing the telephone 10, and the computer or other telematics portable or built in 11 from accessing the Internet or announcing incoming signals, e.g. page, e-mail etc., and to indicate same by actuating a visual indicator and an audio feedback if a driver attempts to initiate telematics during an unsafe or a high risk condition, and may direct a driver to alternative driving habit to gain access to telematics. The system may also suppress delivery of unnecessary external signals such as certain vehicle warning lights or alarms, the system will restore function of the input/output devices when conditions are normalized and will notify driver of all missed activities. In some cases, such as where a drowsiness condition is sensed, an audio alarm 9 is actuated. Other possible alarms to overcome driver drowsiness would include vibration in the seat, changing HVAC temperature settings and blower speed to extremes, etc.

Figure 2:
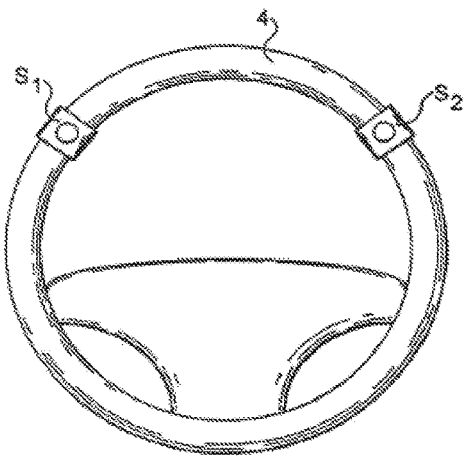
FIG. 2 is an enlarged view illustrating the steering wheel in the vehicle of FIG. 1 and the sensors mounted thereon.

FIG. 2 more particularly illustrates the sensors S1, S2 mounted on the steering wheel 4. As shown in FIG. 2, the two sensors are mounted on or between the "two" and "ten" and the "three" and "nine" clock positions of the steering wheel 4; the "two" and "ten" positions are considered to be the most preferred ones for the two hands of the driver in order to manipulate the steering wheel, but other positions could be employed, such as "nine and fifteen", which provide more clearance for activated airbags. The two sensors S1, S2 thus sense the proper positioning of the two hands of the driver on the steering wheel 4.

The two sensors S1, S2, which may be attached to or embedded in the steering wheel, may be simple electrical switches that are actuated by the respective hand of the driver when properly placed on the steering wheel.

Preferably, however, one or both of the sensors S1, S2 or other sensors are also capable of sensing a physiological condition of the driver, such as the gripping force applied by the driver's hand, or the pulse rate, blood pressure, blood oxygen level, temperature and/or electrical skin conductivity of the driver's hand while gripping the steering wheel. For example, sensor S1 could include a transducer for converting pressure to an electrical signal, such as a spring-type, carbon-type transducer, optical type or semiconductor type. Sensor S2 could include one or more transducers, such as known in finger probes, for sensing pulse rate, temperature, and/or electrical skin conductivity, and for outputting an electrical signal corresponding to the magnitude of the sensed condition, as described for example in U.S. Pat. Nos. 6,319,205; 5,438,986; 5,065,749; 4,860,759; 6,415,176 or 5,897,505, the contents of which are incorporated herein by reference.

As will be described more particularly below, sensors S1 and S2 thus sense that both driver's hands are present on both sides of the steering wheel 4 to enable operation of the telephone 10 and the computer 11 or similar multi-function or standalone telematics or other devices. Thus, the telephone 10 can be permitting "hands free operation" or a telephone/telematics system that can be used as such with an adapter or when docked to the system gateway, as required by-many laws to avoid accidents, but also the driver is permitted to use the telephone only in a "hands free" manner, thereby precluding the driver from gripping a telephone to operate it even though the telephone or the telematics system may have a "hands free" capability. While the presently preferred implementation requires actuation of both sensors S1 and S2, the system could be modified to permit use with only one sensor. This will permit use by drivers having only one hand. Requiring presence of at least one hand on the steering member 3 reduces the likelihood of unintended system activation such as may occur, for example, with voice activated systems that can be activated by any sound within a given range or frequency.

In addition, by providing sensor S1 and/or sensor S2 with the capability of sensing a physiological condition of the driver while gripping the steering wheel, other conditions can be sensed to disable the telephone for further reducing the possibility of an accident. For example, the gripping force applied by one or both hands of the driver may indicate a stress condition of the driver. A stressed condition may be also indicated by the sensed pulse rate, temperature and/or electrical skin conductivity (the latter indicating perspiration) of the driver. If a stress condition is sensed, the telephone 10 is disabled so as to decrease the possibility that the ringing noise of an incoming telephone call will so distract the stressed driver as to create a hazardous condition, or that the making of an outgoing call by the driver will be so distracting to the stressed driver as to create a hazardous condition. Whereas as a matter of standard all alarms are designed to attract attention, e.g. buzzers, ringers, flashing lights, etc., all of these alarms are muted by the gateway and the gateway will communicate all alarms and notification to the driver via driver selected method, e.g. visual, audio or both.

The provision of a grip sensor on the steering wheel also enables the system to sense drowsiness or dozing of the driver, as in U.S. Pat. No. 4,485,375, incorporated herein by reference. Thus, if the gripping force sensed by sensor S1 and/or sensor S2 drops while the vehicle is in motion, this could indicate a drowsiness condition. If such a condition is sensed, the audio alarm 9, which may be a separate alarm or a radio volume control or hvac blower and temperature control, or alternatively a vibrator, may be activated, together with a visual indicator in an attempt to arouse the driver and to alert the driver to the drowsiness condition. When drowsiness is sensed, the telephone 10 would not be disabled since the ringing of an incoming call may be further effective to arouse the driver. Other alarms to overcome driver drowsiness would include vibration in the seat, changing HVAC temperature settings and/or blower speed to extremes, etc.

The sensors S1 and S2 are preferably located at the ten o'clock and two o'clock positions but may be alternatively located in other positions such as the nine o'clock and three o'clock positions. The mechanisms of the switch include, by way of examples without limitation, mechanical, optical or resistive sensors or switches, a jog dial or switch (e.g. of the type that can be rotated to scroll amongst choices and depressed to select a choice), slide switch and a rocker switch. The sensors can be arranged to be actuated either in the thumbs-up position or the thumbs-down position. The sensors are tested for integrity by the microprocessor 20 during start up and are designed to reduce the likelihood of accidental activation. Preferably, the integrity check determines if the switches can be activated and deactivated to ensure that the switches are not stuck in one state. The switches may become stuck unintentionally, or may be purposefully placed in the activated state to override the safety switches and permit actuation of the control system without having one or both hands present on the steering member. The detection of failed switches will cause the microprocessor to block operation of the system. Hence, the integrity check prevents a user from effectively overriding the safety switches to ensure that use of the control system occurs only when the drivers hand or hands are present on the steering member 3.

Sensor S3 is coupled to the steering mechanism 3 so as to sense changes in the steering direction. For example, an alert driver constantly makes minor changes in the steering direction automatically, but not so with respect to a drowsy or dozing driver. Accordingly, if sensor S3 fails to sense a change in the steering direction within a predetermined time interval, this would indicate a possible drowsiness condition in the driver, and therefore the audio alarm 9 would be activated in an attempt to arouse the driver and alert him to that condition.

Sensor S4 senses the depression of the gas pedal 7, and/or vehicle speed or acceleration sensor S5 senses the depression of the brake pedal 8, and sensor S6 senses the condition of the transmission 6 and/or also the velocity of the vehicle. For example, if the transmission is in reverse gear, the driver should not be distracted by receiving or making a telephone call, or by other devices or signals and therefore these things should be disabled. If desired, the same could apply in any gear other than the normal drive gear. Also, if the vehicle is moving at a relatively high velocity, is rapidly accelerating a decelerating, is engaged in turning or otherwise rapidly maneuvering, such that any unnecessary distraction of the driver should be avoided, the devices and signals could likewise be disabled.

Sensor S7 mounted at the front of the vehicle senses its proximity to a vehicle ahead of it; sensor S8 mounted at the rear of the vehicle senses the proximity of a vehicle behind it; sensor S9 senses the darkness level of the road on which the vehicle is traveling (e.g., whether day or night, whether the road is brightly illuminated); sensor S10 senses a rain condition; and sensor S11 senses whether either of the turn indicators of the vehicle is operating to signal for a turn or a change of lanes.

The conditions sensed by sensors S7-S11 are also such that a hazard may be produced if, during the existence of such a condition, the full attention of the driver would be diverted by the ringing of the telephone or by the use of the telephone for making an outgoing call. Accordingly, under such conditions, the telephone 10 is disabled from operation. Similarly, the computer 11, if present, is disabled from operation to preclude access to the Internet for transmitting and/or receiving faxes or e-mail, which could also result in a similar distraction increasing the possibility of causing an accident. And further, other devices, including telematic devices, vehicle signals or alarms, and the like can be suppressed or disabled to avoid or limit distractions to the driver under certain conditions.

Figure 3:
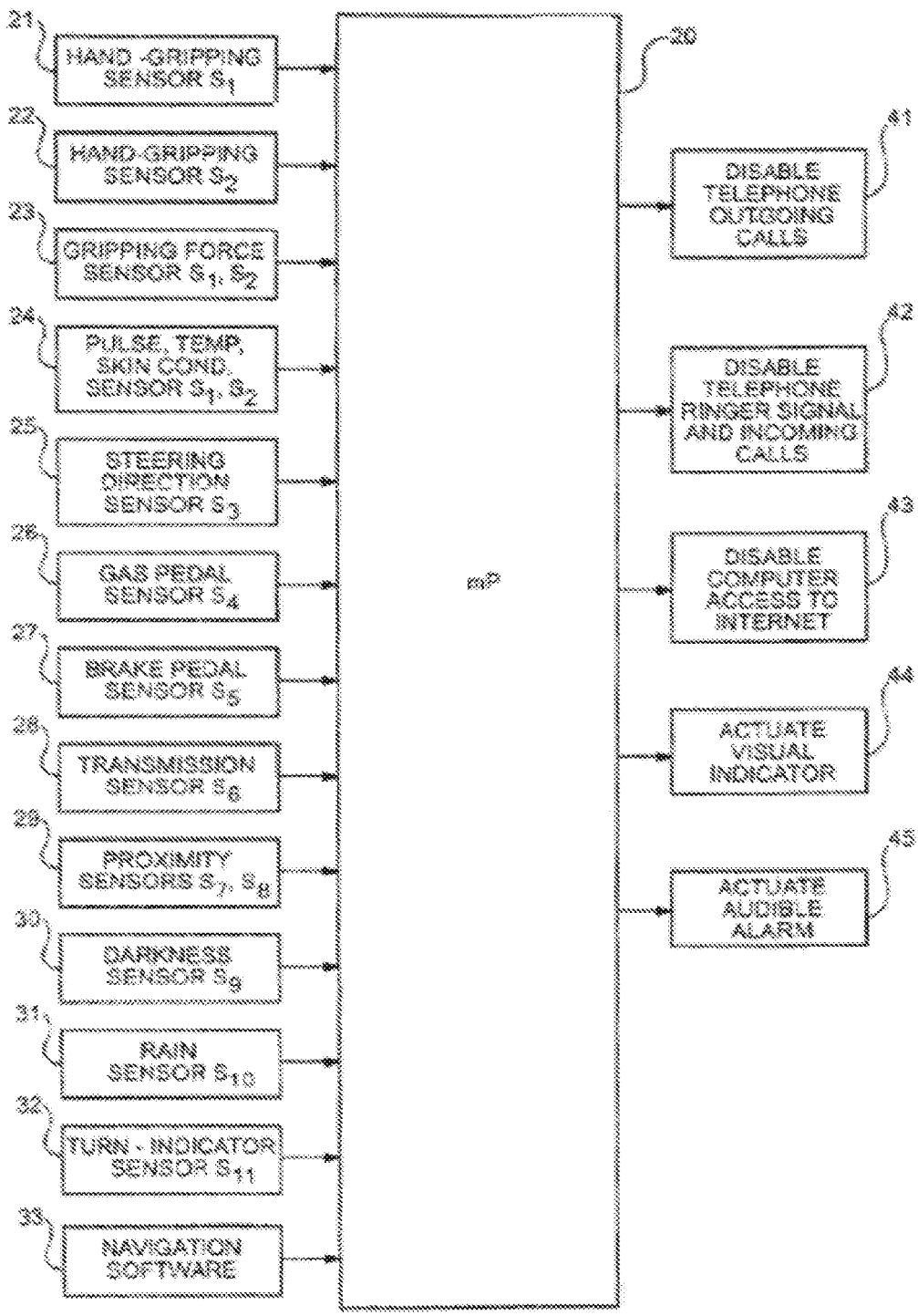
FIG. 3 is a block diagram illustrating the main components in the system of FIG. 1.

FIG. 3 is a block diagram schematically illustrating a microprocessor, generally designated 20, included in the vehicle safety control system of FIG. 1, together with its inputs schematically indicated by blocks 21-33, and the outputs schematically indicated by blocks 41-45.

Thus, as shown in FIG. 3, microprocessor 20 includes inputs 21 and 22 from the steering wheel sensors S1, S2, to indicate whether driver's hands are on the steering wheel. Microprocessor 20 further includes an input 23 indicating the gripping force applied by one or both of the hands to the sensors S1, S2, and an input 24, also from one or both of the sensors S1, S2, indicating the heart pulse rate, skin conductivity, temperature, blood pressure, blood oxygen level, and/or other physiological condition of the driver having a bearing on proneness of the driver to accidents or instantaneous driver stress level or general physical well-being. As indicated earlier, these inputs indicate particularly whether the driver is in a stressed condition, drowsy, or in an alternate embodiment, when an optional breath alcohol sensor is activated. In addition to or in place of the sensors S1 and S2, the physiological conditions can be monitored by other sensors mounted elsewhere in the vehicle including on other locations or the entire surface area of the steering wheel. These sensors may be actuated by direct contact with the driver, or by infrared (for example, to sense increased body temperature and the like), or camera (for example, to sense increased driver agitation, flushed facial appearance, by way of examples without limitation).

Another input into microprocessor 20 is from the steering direction sensor S3, as indicated by block 25. This input is helpful in indicating the alertness of the driver, particularly whether the driver may be in a drowsy or even a dozing state, which would be indicated if this input shows no change in the steering direction within a predetermined period of time. The sensor S3 can also determine rate of change of steering direction, and can provide information used to suppress driver distraction signals when the vehicle is turning sharply, negotiating a long curve that may be blind or of limited sight distance, or during a slalom maneuver.

Another input to the microprocessor would be from a sensor associated with the vehicle cup holder to indicate when a cup which was initially disposed in the holder has been removed, as for drinking. The sensor might include a weight indicator to determine whether the cup was empty when lifted or a temperature sensor to sense heated beverages. This sensor may also sense food on a food tray or elsewhere in the vehicle.

Further inputs into microprocessor 20 include signals from the gas pedal sensor S4 to indicate high acceleration (block 26); the braking pedal sensor S5 to indicate braking (block 27); the transmission sensor S6 to indicate high vehicle speed or reverse drive (block 28); the proximity sensors S7, S8 at the opposite ends of the vehicle to indicate the proximity of the vehicle to other vehicles (block 29); the darkness sensor S9 (block 30); the weather sensor S10 (block 31); and turn-indicator sensors S11 (block 32), and other sensors such as vehicle speed.

FIG. 3 illustrates a further input from navigation software (block 33) with which the vehicle may be equipped in order to assist the driver in navigating the vehicle to various desired locations. For example, the navigation software could be pre-programmed to output a signal to microprocessor 20 at certain locations, such as at heavily-trafficked roads, intersections, bridges, tunnels, etc., where the full concentration of the driver is sufficiently critical to avoid distractions as may be caused by a telephone call or other communication to or initiated from the driver. The system could also provide an alarm to the driver indicating an approaching obstacle or condition that will require the driver's attention, including sharp turns, traffic-jams, intersections, bridges, tunnels, railroad crossings, school zones, traffic lights, construction zones, etc. Such locations could also be programmed by the driver by inputting a place mark when such an obstacle or condition is encountered as a reminder to the driver the next time that obstacle or condition is approaching or encountered. Place marks can be automatically applied by the system when certain threshold conditions are met, for example without limitation, unusual steering or swerving, hard braking or deceleration, and the like. Such place marks can be indicative of "near misses" and may represent areas or locations where the driver needs added caution. Any of the place marks can be incorporated or ignored by the driver as they are made, or at any time thereafter, according to the preferences or profile of the driver. The driver can also set as a preference what criteria the system uses for automatic place marks, or if such place marks are generated at all.

It will be appreciated that other sensors could be provided as inputs into microprocessor 20 wherein similar conditions may occur, either on the part of the driver, the vehicle, and/or the environment, in which, for purposes of safety, external distractions are to be avoided such as may be caused by making or receiving a telephone call, or being alerted by a vehicle signal or alarm, or by any other input/output device.

In the preferred embodiment of the invention, the microprocessor 20, among other functions, acts as a "state machine" to define, arrange and prioritize features and functionalities of the system. In other applications this function can be performed by standalone which interconnects with a microprocessor 20. The state machine aspect of the microprocessor may make telematic control decisions on a variety of criteria such as: (a) the frequency of use of the application, the frequency in which a number, e-mail or URL is contacted; (b) based on safety/urgency priorities, e.g. cruise or CD changer, cell messages or other telematics, or music played on the radio; (c) as preset by the operator; (d) optionally, based on other collected information from the driving system, the microprocessor will initiate calls at predetermined times out of voice mail as, for example, when the driver completes backing out of a driveway and begins a trip. More frequently used applications can be placed higher in the order of applications than others so they can be more quickly and easily accessed, thereby reducing driver involvement in selecting and activating such applications. Further, active applications or most recently used applications can be placed higher in the order of applications so that they can be more quickly and easily accessed. And priority can be given to driving related features or controls over convenience or communication based controls. For example without limitation, if the vehicle cruise control system is active, the first application made available to the driver upon actuation of the control system is preferably the cruise control so that the driver can make any changes to the current cruise control settings, preferably by toggling through and selecting various options/features/settings with the safety switches on the steering wheel. Similarly, if an incoming telematic communication is announced by the system and the system determines it safe to inform driver of such communication, such communication is immediately available for the driver, even if such communication is normally low on the driver priority level.

The user provides signals to the state machine to block features or incoming telematics based on ID, location of phone numbers, e-mail addresses or URL. The blocked or stored telematics will be announced to the driver or stored for use in controlling the system in the future.

The state machine employs an assessment of the incoming calls and places them in categories such as: (a) likely and/or known to cause distraction and accidents; (b) likely but not known to cause distraction and accidents; (c) may cause distraction or accidents; (d) not likely and not known to cause distraction and accidents. These categories will be used to determine the effect of the incoming signals on the telematic system in accordance with the following Table 1:

TABLE 1

Device/Feature assessment.
Copyright © 1982-2002 Applikompt,
Applied Computer Technologies, Inc.

| Categories | | Rank | | | |
|---|---|---|---|---|---|
| Effect | | A | B | C | D |
| 1 | Likely AND/OR Known to cause distraction AND accidents | X | ? | ? | ? |
| 2 | Likely BUT NOT Known to cause distraction AND accidents | ? | X | ? | ? |
| 3 | May Cause distraction or accident | ? | ? | X | ? |
| 4 | NOT Likely AND NOT Known to cause distraction AND Accident | ? | ? | ? | X |

Application usage Assessment
Copyright © 1987-2002

| 01-clearly separating what's: | 1a-Important for safe driving | Class A |
|---|---|---|
| | 1a.1-Subject Vehicle | Class A-S |
| | 1a.2-Other Vehicles | Class A-O |
| | 1b-Important to drivers | Class B |
| | 1c-"Nice to Have" for drivers | Class C |
| | 1d-"Important/Nice to Have" for passengers | Class D |

User interface requirement Assessment
Copyright © 1987-2002

| 02-Assuring driver intent | Class A |
|---|---|
| 03: Simplicity | Class A |
| 04: Accessibility | Class A |
| 05: High Availability | Class B |
| 06: Universality | Class B |

Self customization/individualization requirement Assessment

| 07: Portability | Class B |
|---|---|
| 08: adaptive | Class A |
| 09: Privacy | Class B |

Owner requirement Assessment

| 10: cost | Class C |
|---|---|
| 11: Interchangeability | Class A |

Classification A B or C need to be addressed.
D can be totally ignored.

The outputs from microprocessor 20 include control signals as shown by the following blocks: block 41, effective to disable the telephone or other telematics from making outgoing calls; block 42, effective to disable the telephone or other telematics from receiving incoming calls and from actuating the ringing signal; block 43, effective to disable the computer, if provided, from accessing the Internet to make or receive e-mail, faxes, etc. or to disable any other signal to be otherwise communicated to the driver; block 44, effective to actuate a visual indicator viewable by the driver; and block 45, effective to actuate an audible alarm.

These blocks are representative of a wide range of outputs that may be utilized. For example, while block 41 is nominally listed as disabling outgoing telephone calls, the system may disable (via output 41 or some other output) all communications or input devices to prevent the driver from inputting or initiating activities or communications from them. In addition to disabling incoming telephone calls, output 42 or some other output can disable the output of any or all input/output devices to prevent communication to the driver of the particular output signals from these devices. Hence, the system may disable or suppress the output alarms or signals of a computer, PDA, pager, navigation system, and vehicle alarms or fault indicators (e.g. low fuel level, low washer fluid level, open door, unfastened seat belt indicators, etc.). The outputs 44,45 nominally set forth as actuating visual or audible alarms, can also be used to actuate one or more mechanisms within the vehicle. For example, without limitation, the outputs 44,45 or other output(s) may be operable to move one or more rear view mirrors on the vehicle under certain conditions to change the field of view of the mirrors and aid the driver in maneuvering the vehicle, such as during a lane change at vehicle speed.

Outputs 44 and 45 can activate visual and/or audible alarms to draw the driver's attention to desired locations in the vehicle. This may be useful, for example, to draw the driver's attention to the rear-view mirror within the vehicle when a vehicle behind the driver's vehicle is sensed as being too close to the driver's vehicle for the relative speeds of the vehicles. Here, flashing a light or activating some other visible or audible alarm causing the driver to look in the rear-view mirror can aid the driver in avoiding a potential rear-end collision. Similar lights or alarms can be activated on or adjacent to the outside rear-view mirrors to draw the driver's attention to a particular side of the car. In this latter example, activation of a turn-signal indicating the driver is going to turn in one direction or switch lanes in that direction, may cause a visual alarm to be activated if a vehicle is sensed in sufficiently close proximity to the driver's vehicle in the generally intended direction of travel. In this scenario, the outside rear-view mirror may also be moved automatically by the system to change the field of vision the driver has through that mirror and thereby locate any vehicles in the "blind spot" of that mirror prior to its adjustment.

Additionally, the visual, audible, tactile or other alarms may be activated to increase the driver's attention and/or alertness during certain situations. A drowsy driver may be aroused or have his road alertness increased by flashing or otherwise illuminated or activated (e.g. audible or tactile) alarms. One widely available audible alarm includes the vehicle radio wherein the system can change the volume of the radio to arouse a drowsy driver. A driver engaged in a lengthy telephone conversation, or a lengthy internet usage session, or other lengthy communication session, may become overly focused on the communication and less focused on driving. In such situations, at least some people become focused straight forward, and lack awareness of the peripheral environment, exhibiting so-called "tunnel vision." Activating visual or audible alarms can cause the driver to look away from straight ahead and thereby increase the driver's awareness of the surrounding environment. The output signals may interrupt or override conflicting signals (e.g. audible signals may override the radio) unless the conflicting signals are safety related, or doing so is likely to increase driver distraction. The output signals are preferably adjusted automatically to overcome existing environmental conditions. For example, audible output signals may be louder if the noise level detected within the vehicle is high (e.g. wind noise from a window rolled down), and visual signals may be adjusted in intensity to better accommodate night or daytime viewing.

Operation

Figure 4:
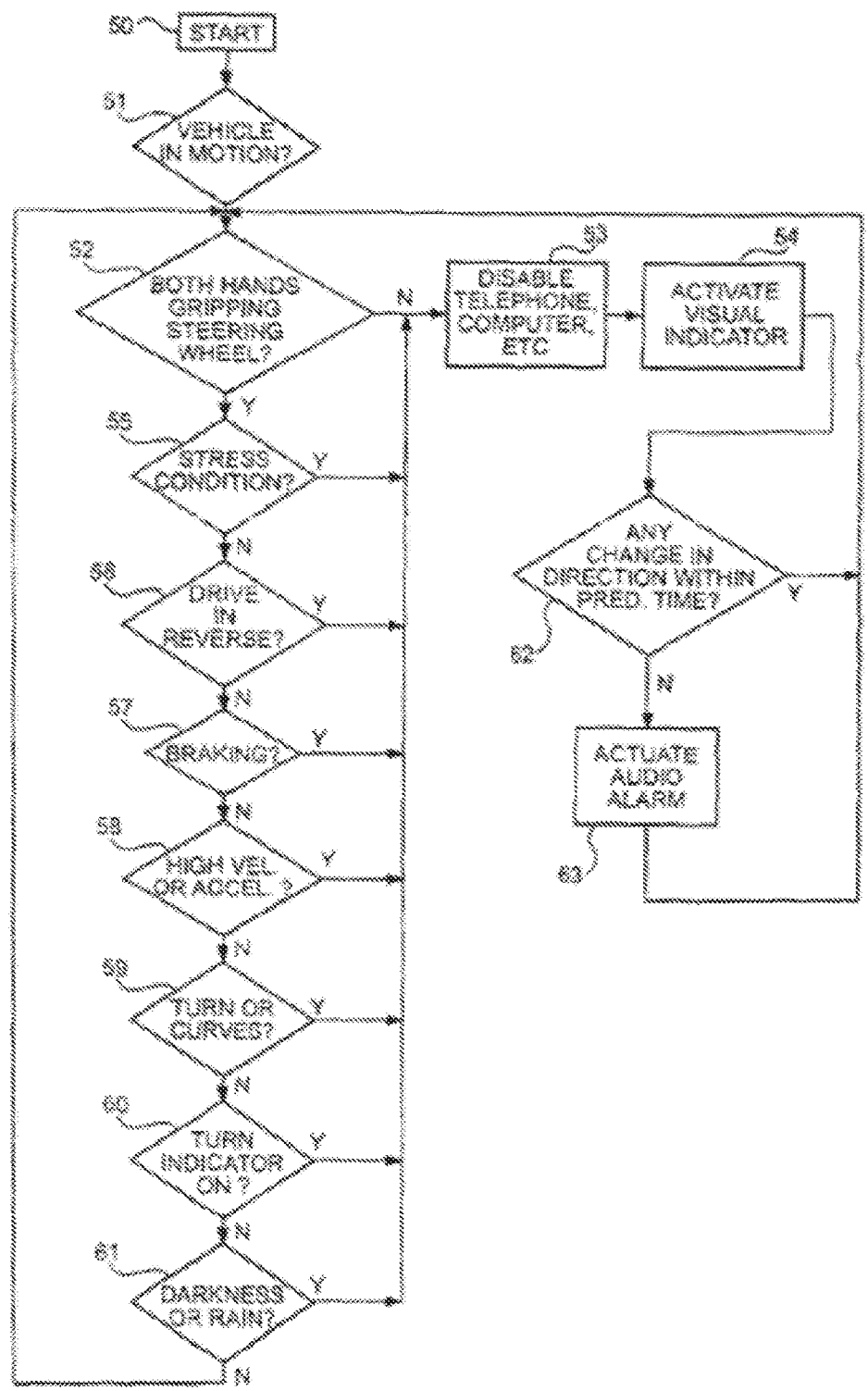
FIG. 4 is a flowchart illustrating the operation of the system of FIG. 1.

FIG. 4 is a flowchart illustrating an example of the operation of the system of FIGS. 1-3.

Thus, as shown in FIG. 4, the control system is made operational when the vehicle is in motion (blocks 50, 51). When the vehicle is in motion, a microprocessor 20 outputs signals 41, 42 and 43 (FIG. 3) disabling the vehicle telephone, computer, etc. within the vehicle (block 53), and also signal 44 actuating a visual indicator within the vehicle to indicate this condition (block 54).

If, on the other hand, both hands of the driver are properly sensed on the steering wheel 4 so as to actuate the two sensors S1, S2, one or both of the sensors is used to sense a physiological condition of the driver that might indicate a stress condition (block 55). For example, such a stress condition could be indicated by an unduly high gripping force applied by one or both of the hands of the driver to the steering wheel, or by an unduly high pulse rate of the driver or skin conductivity of the driver indicating a high degree of perspiration. If such a stress condition is indicated as being present, the telephone, computer, vehicle alarm or signal, etc. are also disabled (block 53), and a visual indicator activated (block 54) to indicate this condition.

Next, the system checks to determine the condition of the vehicle, e.g. whether the vehicle: is traveling in reverse, as indicated by sensor S6 (block 56); is being braked, as indicated by sensor S5 (block 57); is traveling at or over a predetermined high velocity or high acceleration, as indicated by sensor S6 (block 58); is executing a curve or turn, as indicated by steering mechanism sensor S3 (block 59); is about to execute a turn, as indicated by turn indicator sensor S11 (block 60); or is traveling in the dark or in the rain, as indicated by sensor S9 or sensor S10 (block 61). If any of these conditions is sensed, the telephone and the Internet access by the computer are also disabled (block 53), and a visual indicator is actuated to indicate this condition (block 54).

As further shown in FIG. 4, if while the vehicle is in motion no change in steering direction has been sensed within a predetermined time interval (block 62), an audible, visual or other alarm or vibrator is also activated (block 63) to alert the driver to a possible drowsiness or dozing condition. Other alarms to overcome driver drowsiness would include vibration in the seat, changing HVAC temperature settings and/or blower speed to extremes, etc.

If desired, a manual override switch can be provided to enable the driver to manually override any of these controls, preferably except for the control of block 52 assuring that both hands of the driver are properly received on the steering wheel. Setup Scenario:

Driver set up a portable Telematic device such as a cell phone, blackberry, PDA, etc. with driver preferences:

(1) Control preferences, e.g. Hands always Vs Hands on for Telematics only, and/or both hands required on sensors S1, S2 for duration of telematics usage, or both hands needed to initiate telematics, and only one hand required on one of S1 and S2 to continue use of telematics, (2) Annoyance items: Baby crying, Dog barking, smokers in car etc.

(3) Telematics option: Preferred application to use, preferred priority system etc.

(4) Emergency and identifying information.

(5) A driver enters a vehicle
  a. docks all electronic communication equipment, e.g. pager, cell phone, PDA, etc., to the control system wirelessly or physically, thus identifies him/herself to the vehicle
  b. System mutes all Telematics but keeps them active
  c. Driver initiates his/her trip.

Scenario One (Driver Initiated)

The driver wants to make a call, review pages, read e-mail, connect to the Internet, use navigation system, etc.

(1) The driver will activate the safety switches by placing both hands on the designated areas of the steering wheel and then, after the system acknowledges safety switch activation by providing the driver with a beep or voice or visual feedback, the driver with his/her hand on the actuated safety switch will toggle through options with the toggle switch until he gets to a selection that is needed, then using the toggle switch will confirm selection and proceed with the desired action. This could be multiple layers of options and applications, and can be accomplished with one or both of the toggle switches as desired by the driver. The toggle switches preferably can be activated with the thumbs of the driver permitting the hands to remain on the steering wheel. The actuation of the toggle switches can be simplified by a common scheme known as thumb gesture interpretation where a thumbs up (usually indicated by moving a switch upwardly with the thumb or moving the thumb upwardly relative to a switch or sensor) means yes and a thumbs down (usually indicated by moving a switch downwardly with the thumb or moving the thumb downwardly relative to a switch or sensor) means no, such as pushing one or both of the toggle switches upwardly to accept a setting or available option, and pushing one or both toggle switches downwardly to reject a setting or available option. The options can be provided on a HUD or via voice. Even if devices can be activated by voice control, they still need to have the safety switch or switches depressed to ensure driver intention and not an erroneous sound from the radio or a passenger or a malfunction of devices.

During this time the driver's hands must remain at the 10 and 2 position (also called 10:10). The driver must maintain the steering wheel within a specific angle which is calculated based on the following inputs: (1) weather condition, (2) speed of vehicle, (3) proximity of vehicle to others (front/back), feedback from ABS, ESP, traction control, etc. This angle (for example) is about 30 degrees either side of zero if the speed is 40 mph, but it is less when the speed is higher and more when the speed is lower. The driver will also be allowed to temporarily take his hands off the 10:10 position to, for example, make a sharp turn but will have to put them back at 10:10 to continue the previous activity. This amount of time is again dependent on speed, weather, vehicle proximity to others and feedback from ABS, ESP and traction control. In addition to use of a telephone or other telematic device, the switches on the steering member 3 can also be used to control the radio, CD player, cruise control, and environmental settings in the vehicle such as the interior temperature, and blower and heat/AC settings. The switches can be further used to initiate an emergency phone call. In one implementation, an emergency phone call (e.g. dialing 911) can be placed by pushing both toggle buttons in one direction, such as upwardly, and holding them for a period of time. The emergency phone call may activate the phone, or may automatically send by e-mail, voice data or other method information relating to the vehicle position, any airbag deployment, fire or smoke in the vehicle, number of passengers, presence of dogs or other notable things, recent vehicle operational characteristics, and the like. A call to another phone number can be placed by pressing both toggle switches in the other direction and holding them for a desired time.

Scenario Two (Incoming)

Incoming information will be customized by the driver, in accordance with Table A, to select what he/she wants to receive and in what priority. Once incoming information is detected by the system, the system will go through a checklist to verify feedback from steering about position and about speed and ABS and ESP and traction control and weather condition. When all conditions are met, the system will announce the incoming information to the driver who will have to press the safety control switch and accept the communication by holding the toggle buttons momentarily up. While using the toggle switch to accept the incoming information, the remainder of the controls will be as per outgoing, including hands at 10:10.

It will thus be seen that the illustrated system is effective to disable the operation of the telephone, telematic, or other input/output device (and/or access to the Internet by a computer) within the vehicle when any of the above-described conditions is sensed, to thereby avoid a distraction which may cause accidents. The fact that both hands of the driver must be present on the steering wheel in order to enable the operation of the telephone (and/or computer, telematic or other devices) not only requires that the vehicle must be equipped with a "hands free" capability, but that the driver must actually use this "hands free" capability created by the system gateway in order to make or receive telephone calls or other telematics activities. In addition, other sensors could also be provided to disable a vehicle telephone or a multi-function telematics system or Internet access provided by a vehicle computer in response to other conditions, such as the detection within the vehicle of the sounds of an emergency siren in an approaching vehicle, a child crying within the vehicle, the driver handling of a drink or food item from a monitored cup holder or a monitored food tray, or the activities such as modifying the cabin temperature, changing the volume on the radio, extending the sun visor etc.

The monitoring of all such signals, sensors, data and conditions is done by a modular dynamic plug and play state machine that integrates, prioritizes, enables, blocks or mutes telematics application and telematics functionalities based on priorities determined by learning frequency and characteristics of use or by driver preset preferences.

Such machine may be a hardware based, a software embedded in a dedicated hardware or a software/protocol embedded in one or more telematic equipment and it may act as a node on a network of telematic equipment and the vehicle bus, or as a hub for all telematics and a gateway to the vehicle, or any combination of the above.

The state machine can allow driver to set their preferences on a portable telematics device such as a cellular phone, or a WAN, Web site or via a FTP and e-mail. Such set up can be transferred to the vehicle in use when the driver docks the cell phone or other portable telematics devices to the system gateway. The downloaded profile will be updated with driving skills, driver habits and geographical/time/date based notes added by the driver while driving. The updated profile will be uploaded back to the source when the vehicle comes to a final stop, or ongoing as driving is being carried out. Such data may be direct values and status or a statistical representation of a driving experience. Therefore, the driver profile, preferences, history and other relevant data can be transferred to other vehicles by subsequent use of the source within another vehicle. In this manner, the driver's information can be coupled with data particular to the subsequently used vehicle to create another matrix of condition and factor parameters monitored and controlled in use of the vehicle. The information may be stored in any suitable form on any suitable device including on a telematic device (e.g. telephone, PDA, computer, and the like), on a disc, CD, magnetic drive or the like, on a portable digital storage device like those used with digital devices (e.g. compact-flash cards, memory sticks, flash drives and the like). The information may also be transmitted to another source, for example, to an internet web space from where it can be later accessed and used as needed. Vehicle data or information may also be stored either on or in the same source as the driver information, or separately. The vehicle data may stay within the vehicle, or may be transmitted to another location. For example, certain vehicle data may be sent to the vehicle manufacturer or other source to provide information on the performance of the vehicle, consumer use habits, service history, and the like. It should be easy to control access to information stored or generated by the system without the need for a second party. Also, no real time data access is possible to second party without explicit/implicit authorization or high level of sophisticated technology. This protects a drivers profile and other information, including at least the emergency contact information and the like.

The preferences included by the driver will range from telematics management options, e.g. preset priorities or automatic based on learning by frequency of use, tags of time, location and physiology. Preset priorities will allow a driver to assign sequence of access to telematics and telematics functionalities or to block certain activities based on time of day or source of telematics or geography at will. Automatic based learning condition, on the other hand, for example, if the driver physiology shows stress during a telephone conversation with a certain number, such number will be tagged and will be treated as a source of high risk and will be blocked during unusually risky conditions so a driver does not engage in additional cognitive hungry activities. Additionally, if a driver uses telematics device A more often the C which is used more often then B, the access to such devices will be based on the mostly used first. In this case, A is followed by C and C is followed by B. Similar frequency based access priorities are applied to function of such telematics and also prioritized based on time, geography etc.

Other preferences set by the driver can include emergency contacts, medical record summary or identification, etc. to be used along with telemetry data when automatically reporting an accident via text to speech and via e-mail. This will help emergency dispatch understand and prepare the correct type of help needed, e.g. number of passengers, fire in cabin, impact speed, driver physiology and the driving telemetry before and during the impact. The trigger for an accident occurred reporting is preferably by one or more of the following signals: Distance and/or time from speed to zero is smaller than expected (taking into account weather, service monitor, vehicle capabilities, etc.), G-force too high for normal maneuvers, staling after hard breaking, airbag deployment, rollover indication, fire/smoke detected in vehicle.

The decisions to block, enable etc. are accomplished by algorithms that share the hosts of signals provided to monitor for specific conditions that are encountered. These algorithms also update the driver profile to include skills and habits for further relaxing or restricting telematics. For example, a driver that drives frequently on expressways and in close proximity to other vehicles will be allowed more leeway then a person that hardly drives on the expressway. Similar monitoring occurs for nighttime driving, adverse weather driving and so on.

Figure 5:
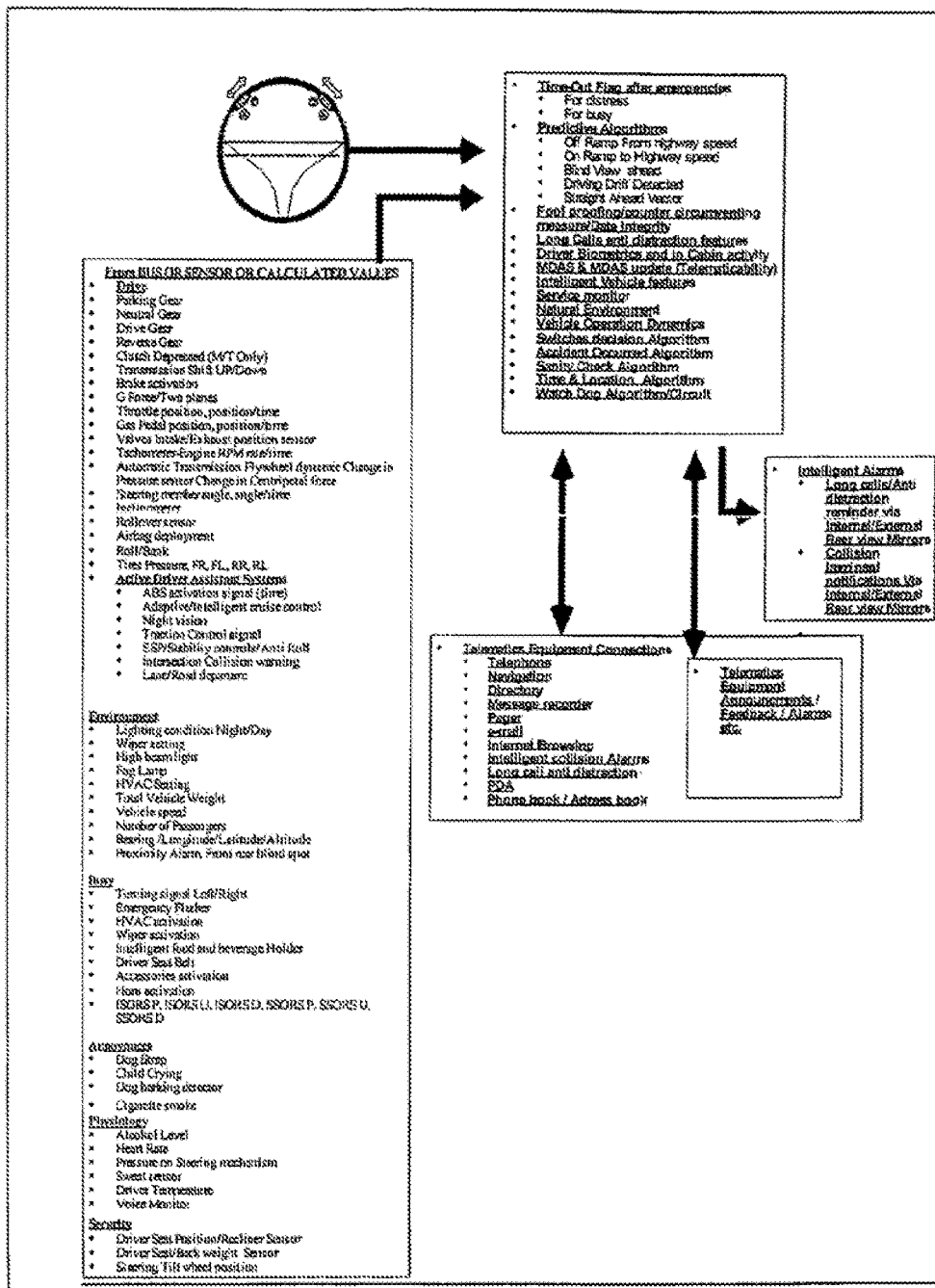
FIG. 5 is a block diagram illustrating the nature and the flow of signals and algorithms used in one presently preferred embodiment of the system of the present invention.

In one preferred implementation, as shown in FIG. 5, the system monitors and analyzes a plurality of factors that can affect the safe travel of the vehicle, either alone or in combination with one or more other factors. Such factors relate generally to the vehicle, the driver, and the environment. The driver has various communication factors, physiological factors, and preferences/habits, skills and historical factors. The vehicle has instantaneous operational factors, and base and historical factors both associated and independent of a driver. The environment includes the interior vehicle environment, the exterior environment, geographic location, and regulatory factors.

Representative examples of driver communications factors include signals and information communicated to the driver such as vehicle warning indicators like low windshield washer fluid, low battery voltage, engine temperature, oil pressure, seat belt usage monitors, and the like. And further examples include input and output features of various devices communicated with the driver such as telephones, pagers, PDA's, computers, fax machines, GPS devices, navigation systems and displays, radios, CD players, CB's, video monitors, and other telematic or informational devices. These devices can be termed communications devices since they permit or provide one-way or two-way communication with a driver of some information or signal. The devices can also be considered input/output devices since some permit or accept driver input and some permit or provide output to the driver. The term input/output devices is not intended to limit application to only devices having both an input and an output, any device permitting or providing either an input or an output, or both, may be used.

Representative examples of driver physiological factors have already been set forth, and include skin conductivity, pulse rate, blood pressure, blood oxygen level, grip pressure, alcohol sensed on driver's breath body temperature and the like. Other examples of driver physiological factors include driver seat position, seat belt usage, seat belt position (used in part to determine if driver is fully seated or leaning forward, etc.), and driver position within the seat, driver seat reclining position and the steering member position such as tilt/telescoping adjustment. Drivers also have base and/or historical factors such as driver experience indicators (e.g. normal driving patterns, preferences, skill level, relevant training and safety record), Representative examples of factors relating to the vehicle and its operation include whether the vehicle is in reverse, in park, accelerating, decelerating, traveling at high speed, negotiating a turn, swerving, making an extended length turn, turning at relatively high velocity, traveling without direction correction (one possible indication of a drowsy driver as noted previously), whether there is fire or smoke in the vehicle, and whether the engine has stalled (as may be indicated by movement of the vehicle without continuing engine operation), tire pressure, whether the vehicle has rolled-over or been inverted, is climbing or descending a hill, if the airbags have deployed, and if the ABS, traction control, or stability systems have been activated. Base or historical vehicle factors include whether the vehicle has driver assistance systems like ABS, adaptive cruise control, traction control, ESP/stability or other electronic steering assist, four-wheel drive, all-wheel drive and the like, as well as historical data indicative of service condition, tire wear, brake wear, and habits/skills of the driver within said vehicle, driving application (e.g. recognizing difference in usage between a family sedan and a police cruiser), minimum braking distance, maintenance history.

Representative examples of environmental factors include exterior conditions such as weather (rain, snow, bright sunshine, etc.), time of day (e.g. night or day), road conditions (e.g. wet, icy, etc.), proximity to other vehicles, proximity to known obstacles, and the like. Further representative examples of environmental factors preferably also include interior conditions such as loud noises like a crying baby or barking dog, and the presence of cigarette smoke in the vehicle which can be an irritant to at least some drivers.

Representative examples of regulatory factors include speed limits, traffic signals, and specified rules for certain roads and the like.

The factors are monitored and compared to set or determined thresholds to determine the level of driver attention required to safely control the vehicle. The system controls all machine to man communications (e.g. phone, vehicle alarms/indicators, computer, PDA, etc.) to and from the driver as a function of the monitored factors that provide an indication of the level of attention required by the driver to safely operate and control the vehicle. Conditions and factors that require a higher level of driver attention cause the system to permit less or no communication to and from the driver. This reduces driver distraction and frees the driver's senses so that they may be employed to ensure safe vehicle operation. The factors and conditions are assessed, rated and/or compared to threshold values. A single factor over a threshold value may be sufficient to cause the system to restrict, suppress or disable communications to and from the driver. Also, several factors, even if no single factor is over its threshold value, can cause the system to restrict communications to and from the driver. In other words, the relative severity of a combination of individual conditions encountered by the driver can cause an aggregate value over a threshold wherein further driver distraction is not desirable, so the system prevents communications to and from the driver in such situations. For example, the presence of water on the driving surface may not by itself be enough to cause the computer to restrict communications to and from the driver, but wet roads in combination with another condition like unusual driver physiological symptoms indicating increased driver stress, may be enough to cause the system to restrict or prevent communications with the driver. In this manner, the factors and conditions signals can be considered to be rated or valued with the ratings and values weighted and combined, or otherwise statistically rendered to provide an overall assessment of the driving conditions. Further, certain of the factors can be made dependent on other factors. For example, without limitation, the presence of water or ice on the road may be used to alter the threshold value or level relating to proximity to other vehicles since an increased stopping distance may be required when driving in such road conditions. Such diminished road conditions can also lower the acceptable speed or acceleration parameters.

Certain of the thresholds may be set or predetermined prior to installation of the system, and other thresholds may be learned or determined through use of the system in accordance with driver experience, history, preferences, as well as vehicle features, information and history. For example, one vehicle may be able to stop faster than another, so the threshold for the proximity to other vehicles can be different between the vehicles as the one vehicle can travel closer to other vehicles and safely stop in an emergency. Likewise, a driver that frequently travels on expressways at relatively high speeds in relatively close proximity to other vehicles may be permitted more leeway for communications in such conditions than a driver that rarely or never travels in that manner. Likewise, a driver that frequents a certain geographic region may be given more leeway for communications in that region than a driver outside of his normal driving region since that driver may be distracted trying to navigate in unknown regions. Likewise, drivers in vehicles with ABS, or other advanced safety features may be permitted greater leeway in communications that drivers in vehicles without such features in situations and conditions where these features improve the vehicle response and safety. Accordingly, the thresholds for individual driving factors and conditions, or combinations of factors and conditions, can be customized based on the driver and the vehicle. If desired, the driver profile can be continually updated based on feedback obtained as to the driver's driving habits, and such profile updates can be made based on real-time data, or statistical analysis.

Additionally, the various communications or inputs/outputs to and from the devices in the vehicle may detract differently from the driver's attention and ability to safely control the vehicle. Making a phone call may involve searching a database of names and phone numbers, dialing numbers, using voice activation or other tasks, and may be more driver intensive than answering a phone call of being alerted of a vehicle fault (like low washer fluid, low fuel level, etc.). The level of driver involvement and/or potential distraction from the various communications devices, both when initiated by the driver and when communicated to the driver (where appropriate), is another factor that can be assessed to determine the level and timing of any restriction of the driver communications. So under at least some conditions certain communications to and from the driver may be restricted or suppressed while others are permitted.

When the assessed risk to the driver and other vehicles and things, is borderline (i.e. higher than normal risk, but not severe), the system may provide recommendations to the driver as to how to overcome any communications restriction, if doing so will not cause undue driver distraction. For example, without limitation, if the vehicle is traveling too fast to safely receive an incoming or make an outgoing telephone call, the system may inform the driver (either audibly or visually) to slow down to enable the telephone. Hence, the driver is permitted access to the communications if corrective action is taken (avoiding swerving, slowing down, driving within speed limit, increasing distance between adjacent vehicles, etc.). Similarly, a time-delay may be initiated after certain conditions are sensed, like unusually rapid braking, or swerving, or the like to prevent immediate inputs to or outputs from the device as soon as the vehicle and driver factors are within allowable limits. This time-delay permits the driver to regain composure and assess the current situation prior to use of or interruption from the various input/output devices.

The system preferably permits significant customization by the driver. The driver can preferably select the type of feedback provided by the system (audible, visual, tactile, etc.), and when the feedback is provided (e.g. not during telephone calls, etc.). The driver can also preferably customize the voice used in any voice feedback, or the tones, tactile response, or visual display, if any. This customization helps to reduce distraction or annoyance caused to the driver by the system feedback, and thereby helps to maintain driver concentration and awareness of the vehicle and the environment.

The system preferably also provides a cross-check of at least some sensed conditions, such as vehicle operational conditions, to ensure that individually but related conditions are in agreement. For example, the system may compare sensed RPM or engine rotational speed with the throttle or velocity sensor and transmission sensor to ensure the sensed vehicle operating characteristics are all in agreement. If they are not, it could indicate a vehicle fault (e.g. slippage of the transmission or the tires on the road) and the system applies a more stringent restriction of the input/output devices as appropriate. The control system can be disabled by the user, but preferably, to do so requires the user to activate some signal viewable by others that indicates the vehicle is operating out of normal constraints. One readily available mechanism that satisfies the above is the emergency or hazard lights provided on most vehicles and operable to cause several exterior lights to repeatedly flash indicating vehicle distress. Accordingly, in some implementations, the control system may be overridden by activating the vehicle emergency lights.

The system preferably includes a learning mode wherein certain routine or unusual events, conditions, locations, phone numbers and the like are stored for later access. In the learning mode the microprocessor or other controller may accept an input from a driver to store an address of a particular location, or may inquire if the driver wants the address stored wherein the driver may respond no or yes by activating the toggle switches on the steering member. The address can be stored as a function of its geographic location (latitude/longitude) for later access to, for example, facilitate finding that location at a later date, perhaps with the assistance of a navigation system. The learning mode could also be used to call out other features the driver may want to be reminded or warned of in the future, such as school zones, railroad crossings, changing speed limits, etc. The system could prompt or notify the driver when the vehicle is approaching such stored features as a function of the vehicle heading and geographic location. The learning mode provides increased customization ability to the driver, and can help build the driver's profile/driving habits and characteristics. The learning mode can be activated and deactivated by the driver, and may be preset for automatic use upon initial use of the system and for a certain time thereafter, subject to the ability of the driver to manually override such setting.

The system preferably also has a training mode wherein the system provides increased assistance to a driver to familiarize the driver with usage and various characteristics and features of the system. In training mode, the system may assist driver selection of applications by instructing or notifying the driver of the manner by which applications can be selected, as well as choices within an application. Training mode may also provide increased feedback of the reasons for suppression of any input/output device, and perhaps, ways to avoid such suppression (reduce vehicle speed, avoid harsh accelerations, etc.). The training mode can be activated and deactivated by the driver, and may be preset for automatic use upon initial use of the system and for a certain time thereafter, subject to the ability of the driver to manually override such setting.

Predictive algorithms can be used to determine certain driving conditions based on driver habits and history, as well as data from research, or other drivers and the like. For example, the vehicle may perform certain maneuvers prior to exiting from a freeway to an off-ramp, or entering a freeway from an on-ramp. The vehicle may decelerate and gradually turn onto an off-ramp, and then further decelerate and negotiate a sharp turn on the off-ramp, or preform some other maneuvers from which the system can predict that the driver is exiting a freeway. From this prediction, the system may increase the restriction of telematics or other communications with the driver. Similar predictive behaviors or maneuvers may be detected for entering a freeway, and the system may likewise increase restrictions of communications.

Therefore, in at least one presently preferred embodiment of the safety control system for vehicles, the system includes a communication device having at least one of an input accessible from within the vehicle and an output communicated within the vehicle, at least one sensor operable to sense at least one condition related to vehicle operation, and a controller communicated with the sensor and the communication device to selectively suppress at least one of said input and said output in response to a sensed parameter of said at least one condition being outside of a threshold. The communication device can be at least any of those previously mentioned herein, for example without limitation, a telephone, PDA, computer, vehicle alarm or indicator, navigation system, DVD player/recorder, CD player/recorder, and other electronic and/or telematic or other input/output devices accessible by the driver, and/or providing information or some communication to the driver. The sensors can also be at least any of those previously mentioned herein, for example without limitation, the physiological sensors, safety switches, toggle switches, vehicle operational sensors (e.g. steering, acceleration, deceleration, etc.). And the controller can be at least any of those previously mentioned, for example without limitation, a stand alone unit with built-in microprocessor, an existing vehicle processor or control unit, and the like, and can be arranged to communicate with the driver and/or other devices as set forth herein.

While it will be appreciated, therefore, that while the invention has been described with respect to one preferred embodiment, many other variations, modifications and applications of the invention may be made. For example, without limitation, while the preferred embodiment requires the driver to maintain both hands on the steering wheel to initiate, receive and maintain communications or system access, other schemes may be used. For example, the system may require presence of two hands on the steering wheel to initially activate the system, and perhaps provide initial input (e.g. to place a telephone call and the like), but after such activation or initial input, the system may permit one hand to be removed from the steering wheel. This would facilitate, among other things, shifting a manual transmission. Shifting a manual transmission can be accommodated in the scheme requiring both hands on the steering wheel by permitting one hand to leave the steering wheel when the clutch is sensed as being activated to shift gears. Of course, other modifications, substitutions and applications can be accomplished in view of this disclosure.

ABSTRACT OF THE DISCLOSURE

According to one aspect of one embodiment of the present invention, a safety control system for vehicles, includes, a communication device having at least one of an input accessible from within the vehicle and an output communicated within the vehicle, at least one sensor operable to sense at least one condition related to vehicle operation, and a controller communicated with the sensor and the communication device to selectively suppress at least one of said input and said output in response to a sensed parameter of said at least one condition being outside of a threshold. When an input is suppressed, the driver is prevented from accessing or inputting information into the communication device. When an output is suppressed, communication between the device and the driver of a vehicle is suppressed to, among other things, avoid distracting the driver during certain driving situations or conditions relating to the driver, vehicle and/or environment.

The invention claimed is:

1. A telematics system for a motor vehicle, wherein the motor vehicle has a bus and the telematics system is operable by a driver of the vehicle, the telematics system comprising:
   a first mode of operation and a reduced distractions mode of operation;
   the telematics system configured to be operatively coupled with a cellular phone having at least one feature and an output;
   the telematics system operable by a driver of the motor vehicle;
   the telematics system configured to be operatively coupled with a web server;
   the telematics system being operatively coupled to the vehicle's bus and being configured to receive at least one of a vehicle transmission information and a vehicle movement information from the bus;
   the telematics system configured to automatically switch between the first mode of operation and the reduced distractions mode of operation, as a result of at least one predetermined condition being met by the at least one of the transmission information and the vehicle movement information; and,
   wherein the telematics system, while operating in the reduced distractions mode of operation, is configured to disable the at least one feature, suppress at least a portion of the output and provide at least one indicium to the driver that the reduced distractions mode of operation is active; wherein the at least one indicium is presented by the motor vehicle.

2. The telematics system of claim 1, further configured to provide a second output format instead of the suppressed output format.

3. The telematics system of claim 1, further configured to receive settings from the web server.

4. The telematics system of claim 1, further comprising the telematics system being configured to receive a navigation information from the bus.

5. A method for providing safety to a driver in a motor vehicle that includes a bus, a cellular phone and a web server, the method comprising:
   receiving at a controller a vehicle transmission information and a vehicle movement information from the bus;
   determining from at least one of the vehicle transmission information and the vehicle movement information, that a predetermined condition has been met;
   the controller, in response to determining that the predetermined condition has been met, switching between a first mode of operation having at least one feature wherein the at least one feature includes an output and a reduced distractions mode;
   wherein in the reduced distractions mode of operation the at least one feature is disabled and at least a portion of the output is suppressed;
   and the controller providing at least one indicium from the motor vehicle that the reduced distractions mode of operation is active.

6. The method according to claim 5 further including the controller receiving at least one setting from the web server.

7. The method according to claim 5, further including the controller receiving a navigation information from the bus.

8. The telematics system of claim 7, further including the controller determining from the navigation information that the predetermined condition has been met.

9. The method according to claim 5, wherein the output is a ringer signal.

10. The method according to claim 5, wherein the output is an incoming call notification.

11. The method according to claim 6, wherein the second output format is a missed call notification.

12. The method according to claim 5, wherein the feature is placing a phone call.

13. The method according to claim 5, wherein the feature is an Internet access operation.

14. A telematics system for a motor vehicle, wherein the motor vehicle has a bus and the telematics system is operable by a driver of the motor vehicle, the telematics system comprising:
   a first mode of operation and a reduced distractions mode of operation;
   the telematics system configured to be operatively coupled with a cellular phone having at least one feature and an output;
   the telematics system configured to be operatively coupled with a web server;
   the telematics system being operatively coupled to the motor vehicle's bus and being configured to receive a vehicle transmission information from the bus;
   the telematics system configured to automatically switch between the first mode of operation and the reduced distractions mode of operation, as a result of at least one predetermined condition being met by the vehicle transmission information; and,
   wherein the telematics system, while operating in the reduced distractions mode of operation, is configured to disable the at least one feature, suppress at least a portion of the output and provide at least one indicium to the driver that the reduced distractions mode of operation is active.

15. A telematics system for a motor vehicle, wherein the motor vehicle has a bus and the telematics system is operable by a driver of the motor vehicle, the telematics system comprising:
   a first mode of operation, a second mode of operation, and a third mode of operation each being respectively configured to operate a first, a second, and a third set of telematics features; wherein at least the first set of telematics features is disabled in the second mode of operation and at least the second set of telematics features is disabled in the third mode of operation;
   the telematics system configured to be operatively coupled with a cellular phone;
   the telematics system configured to be operatively coupled with a web server;
   the telematics system being operatively coupled to the motor vehicle's bus and being configured to receive at least one of a vehicle transmission information and a vehicle movement information from the bus;
   the telematics system configured to automatically switch between the first, the second, and the third modes of operation based on at least one of the transmission information and the vehicle movement information.

16. The telematics system of claim 15, wherein the first and the second sets of telematics features respectively include a first and a second output format for substantially the same information, and the first output format is disabled in the second set.

* * * * *

Disclaimer and Dedication

10,532,709 B2 - Mouhamad A. Naboulsi, West Bloomfield, MI (US). SAFETY CONTROL SYSTEM FOR VEHICLES. Patent dated January 14, 2020. Disclaimer filed November 8, 2022, by the assignee, Safe Driving Technologies LLC.

I hereby dedicate to the public the entire term of claims 1-7 and 14-16, of said patent.

*(Official Gazette, May 2, 2023)*